United States Patent
Gilsdorf et al.

(10) Patent No.: US 7,092,841 B2
(45) Date of Patent: Aug. 15, 2006

(54) METHOD FOR DETERMINING THE ABSOLUTE POSITION OF A MOVABLE COMPONENT

(75) Inventors: Heinz-Joachim Gilsdorf, Donnersdorf (DE); Achim Thomae, Bergrheinfeld (DE); Stefan Rappelt, Gerolzhofen (DE); Thomas Kutsche, Schweinfurt (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 11/003,164

(22) Filed: Dec. 3, 2004

(65) Prior Publication Data

US 2005/0137828 A1    Jun. 23, 2005

(30) Foreign Application Priority Data

Dec. 3, 2003    (DE) ............................. 103 56 402

(51) Int. Cl.
*G01C 9/00* (2006.01)
(52) U.S. Cl. ..................................... 702/150
(58) Field of Classification Search ................. 702/150
See application file for complete search history.

(56) References Cited

U.S. PATENT DOCUMENTS

| 4,841,446 A * | 6/1989 | Leiber et al. ................. 701/76 |
| 5,579,230 A * | 11/1996 | Lin et al. ...................... 701/70 |
| 6,036,199 A | 3/2000 | Oshida et al. |
| 6,466,887 B1 * | 10/2002 | Weinbrenner ............... 702/141 |

FOREIGN PATENT DOCUMENTS

| DE | 40 14 561 | 11/1991 |
| DE | 102 33 527 A1 | 2/2004 |
| EP | 0 559 162 | 9/1993 |
| FR | 2863353 | * 6/2005 |
| JP | 04 339010 | 11/1992 |

* cited by examiner

*Primary Examiner*—John Barlow
*Assistant Examiner*—Cindy D. Khuu
(74) *Attorney, Agent, or Firm*—Cohen, Pontani, Lieberman & Pavane

(57) ABSTRACT

A first acceleration sensor is arranged on a vehicle body for detecting an acceleration signal of the vehicle body and a second acceleration sensor is arranged on a wheel-side axle part for detecting an acceleration signal of the wheel-side axle part, the vehicle body and the wheel-side axle part execute relative movement with respect to each other. The wheel acceleration signal and the body acceleration signal are each integrated twice to form respective distance signals. The difference between the two distance signals at a first time ($t_0$) is determined and stored as a gap value. A second distance signal difference is determined at a second time ($t_1$) for a new gap value. When the wheel-side axle part reaches a reference position with respect to the vehicle body during the relative movement between the axle part on the wheel side and the vehicle body, a switching signal is generated and is used as a reference signal for determining the absolute position of the wheel side axle part along with the difference calculations.

6 Claims, 1 Drawing Sheet

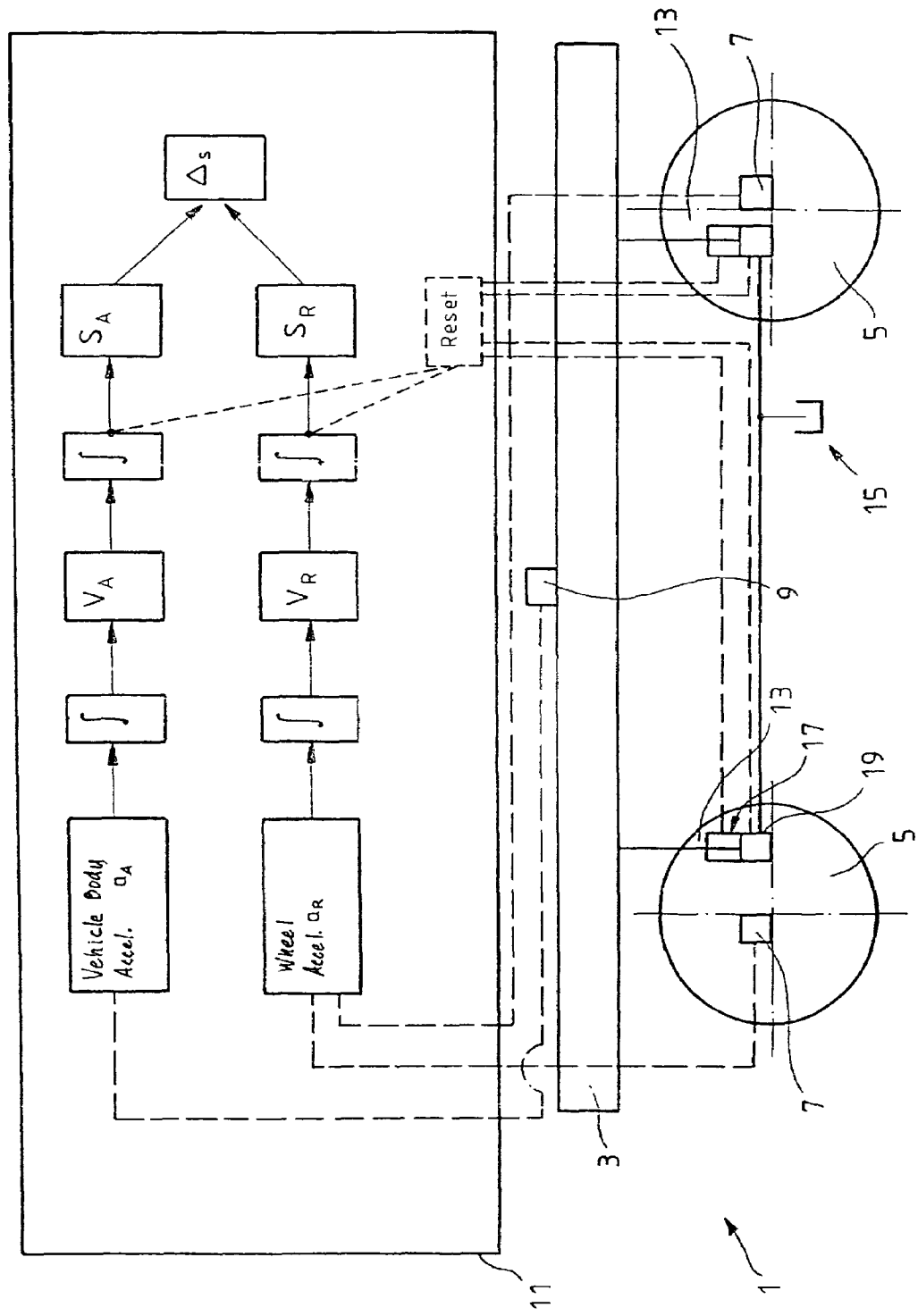

METHOD FOR DETERMINING THE ABSOLUTE POSITION OF A MOVABLE COMPONENT

BACKGROUND OF THE INVENTION

1. Field of the Invention

The present invention relates to a method for determining the absolute position of a movable component within a vehicle chassis.

2. Description of the Related Art

In motor vehicles, the demand for adjustable damping and adjustable suspension forces and for ride leveling is increasing. For ride leveling, the main parameter to be determined is the stationary or dynamic deviation from a specified normal or reference position. The standard method of determining the stationary or dynamic deviation is based on the installation of a transmission linkage between an axle component and the vehicle body, so that the relative movement between the vehicle axle and the body may be used as a signal for adjusting the level of the body. A significant disadvantage of this principle is that these types of mechanical solutions must always be adjusted as part of the installation process.

An alternative method for determining the stationary or dynamic deviation from the normal or reference position is to determine an operating position of a vibration damper, which is connected to the chassis. For this purpose, an inductive measuring arrangement may be provided between the piston rod and the cylinder of a vibration damper. This requires magnets to be installed inside the piston rod, for example, which means that the piston rod must be fabricated of austenitic steel, which considerably increases the cost of the piston rod. In addition, a certain amount of space is required to accommodate the magnets inside the piston rod to ensure a sufficiently strong signal. A minimum wall thickness of the piston rod is required surrounding the magnets in the piston rod. However, the required minimum wall thickness may cause the diameter of the piston of the piston rod to be too large for many smaller, lighter vehicles.

Numerous attempts have been made to determine the position of the piston rod using a mark on the piston rod in conjunction with a read sensor. So that an absolute position may be measured, the mark must be unmistakable. In addition, the mark must avoid producing a negative influence on the seal of the piston rod of the vibration damper, because otherwise the service life of the unit would be reduced.

SUMMARY OF THE INVENTION

An object of the present invention is to provide a measuring method for determining the absolute position of a movable component, especially within a chassis, which avoids the problems associated with the known prior art.

According to the present invention, the object is achieved by twice integrating a wheel acceleration signal of a wheel-side axle part and a body acceleration signal of a vehicle body to form distance signals, wherein the difference between the two distance signals at a time $t_0$ is stored as a gap value, a second distance difference signal being determined at time $t_1$ to obtain a new gap value. A switching signal is generated when the wheel-side axle part reaches a reference position with respect to the vehicle body during the relative movement between the axle part on the wheel side and the vehicle body, the switching signal causes the reference position to be used as a reference signal for the difference calculation, thereby providing a calibration of the determined position.

An advantage of the present invention is that the acceleration sensing devices are typically already present. In addition, no additional sensors are required to produce the absolute distance signal of the vehicle body and/or of the wheel. On the contrary, only a simple switch with a 0/1 signal is needed. The switch may be installed at any desired point, e.g., on or in a vibration damper or a pneumatic spring of the chassis. It is conceivable, for example, to make use of the stop buffer of the vibration damper as one part of the switch or even to use a device provided to protect the piston rod, such as a protective tube, as a switch carrier. In any case, it would not be necessary to take any of the previously described measures with respect to the design and fabrication of the piston rod of the vibration damper.

A basic additional requirement is that a reference signal should be available to balance the system as soon as possible after the vehicle has been started. If the vehicle is heavily loaded while it is parked, for example, and no current is being supplied to its electrical system, it is possible for the vehicle to assume a level permanently beyond the reference position. For this reason, several reference positions with different reference signals may be used.

If the vehicle is in a loaded state and is between two reference positions and if the wheel does not move significantly thereafter because the vehicle is traveling over a very smooth road, the load state can be detected quickly by providing a sensor on more than just the one wheel. The wheel at which one of the reference positions is reached first can then be used as a base setting for a new chassis adjustment. If the base setting thus obtained is incorrect and the entire vehicle is then raised when its level is adjusted, it is almost certain that the other sensed wheels will reach their reference positions, on which basis the system can then be balanced correctly.

So that a reference position can be reached quickly, it is advantageous for the reference position to correspond to a position which can be reached by the wheel as a result of its spring deflection.

As a temporary measure until a reference position is reached, a predetermined design position can be used as a reference level for the determination of the absolute position.

If the vehicle has automatic ride leveling, the duration of the learning period for detecting the reference position can be considerably reduced by changing the level of the body with respect to the sensed wheel after the vehicle has been started, this change in level being greater than the gap between at least two reference positions. It is necessary here for a reference position to be reached and exceeded. This position then enters immediately into the calculation of the absolute position, and if the position is incorrect, it can be corrected quickly.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The only drawing, FIG. 1, is a schematic diagram of components for determining an absolute position of a movable component relative to a vehicle chassis according to the present invention.

DETAILED DESCRIPTION OF THE PRESENTLY PREFERRED EMBODIMENTS

The single FIGURE is a schematic diagram of a vehicle 1 with a body 3 and a wheel-side axle part 5. The wheel-side axle part 5 may be the wheel itself or may be a movable steering rod on the axle. An acceleration sensor 7 in provided on each wheel-side axle part 5 and an acceleration sensor 9 is provided on the vehicle body to detect the vertical acceleration. The signals generated by the acceleration sensors 7, 9 are sent to a computer unit 11. A vibration damper 13 and/or a pneumatic spring, referred to as "assembly 13" below, is mounted on the sensed wheel-side axle part 5. The absolute position of the stroke of the assembly 13 is the value which is to be determined. The assembly 13 may be connected to a pressure-supply system 15 for ride leveling, or may be adjusted electrically. On or in the assembly 13, at least one reference position 17, 19 may be used to produce a switching signal. If several reference positions 17, 19 are present, as shown in the FIGURE, the computer unit 11 will be able to differentiate between the switching signals of the various reference positions 17, 19, i.e., each reference position generates a unique switching signal.

To determine the absolute position of the movable component, that is, the stroke position of the assembly 13, the acceleration signals of the axle parts $a_R$ and of the vehicle body $a_A$ are sent to the computer unit 11 at a time $t_0$. By integration of the acceleration signals $a_A$ and $a_R$ to form velocity signals $V_A$, $V_R$, by additional integration of these signals to form distance signals $S_A$, $S_R$, and by calculation of the difference between the two distance signals, a gap value $\Delta s$ is obtained at time $t_0$. The acceleration signals are to be considered vectors, so that, by means of a second measurement at time $t_1$, it is possible to find out how far the position has changed with respect to time $t_0$. The absolute position is determined based on the change in position with respect to a reference position.

When the wheel-side axle part 5 reaches one of the reference positions 17, 19, a position-dependent reference signal for time $t_0$ is sent to the computer unit 11. It is then possible to determine uniquely the absolute position of the wheel-side axle part 5 at time $t_1$ and possibly to make changes to the adjustment of the assembly. Using the reference signal in this way is equivalent to a calibration of the method.

The functional quality of the method is determined in part by the speed at which the calibration may be carried out. Various measures may be taken to ensure that this is done quickly. A first measure is always to start with a vehicle which is at least lightly loaded and to assign the reference position to an even deeper spring deflection position, which will always be reached in practice. Until the reference position is reached, the system will use a design position as the current reference position. Alternatively or in addition, the reference position may also be determined by the wheel-side axle part which is the first to reach a reference position, which is then used as the base setting for a new chassis adjustment. To carry out a ride-leveling operation, it is possible, for example, to change the level of the body with respect to the sensed wheel immediately after the vehicle has been started. It is advisable here for the change of level to be greater than the gap between at least two reference positions. This guarantees that at least one reference position will be crossed, and the system can then be successfully calibrated. The calibration is done not only the first time a reference position is reached but every time a reference position is reached, because the multiple integration of the acceleration signal is inherently associated with a certain inaccuracy.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for determining an absolute position of a movable wheel-side axle component in a vehicle body, wherein a first acceleration sensor is arranged on a wheel-side axle component for generating a wheel-side acceleration signal and a second acceleration sensor is arranged on the vehicle body for generating a body-side acceleration signal indicative of changes in a vehicle body leveling state, the wheel side axle component and vehicle body being relatively movable, said method comprising the steps of:

twice integrating each of the wheel-side acceleration signal and the body-side acceleration signal to respectively form a wheel-side distance signal and a body-side distance signal;

determining a first difference between the wheel-side distance signal and the body-side distance signal at a first time and storing the first distance as a first gap value;

determining a second difference between the wheel-side distance signal and the body-side distance signal at a second time as a second gap value; and generating a switching signal when the wheel-side axle component reaches a reference position relative to the vehicle body and using the switching signal to indicate a reference position at time $t_0$, the absolute position of the wheel-side axle component being determined by the reference position and a change from the reference position based on the first and second gap values.

2. The method of claim 1, wherein the wheel-side axle component includes a plurality of reference positions relative to the vehicle body, said step of generating comprising generating a different reference signal for each of the respective reference positions when the wheel-side axle component reaches the each of the respective reference positions.

3. The method of claim 1, wherein a plurality of first acceleration sensors are arranged on respective wheel-side axle components for generating wheel-side acceleration signals, said method further comprising the step of using the reference signal of a first one of the wheel-side axle components to reach a reference position as a base setting for a chassis adjustment.

4. The method of claim 1, wherein the reference position corresponds to a spring deflection position of a vibration damper connected to the wheel axle component.

5. The method of claim 1, further comprising the step of using a predetermined design position as the reference signal for the determination of the absolute position until a reference position of the wheel-side axle component is reached.

6. The method of claim 1, wherein the wheel-side axle component includes a plurality of reference positions relative to the vehicle body, said method further comprising the step of changing the level of the vehicle body relative to the after the vehicle has been started, the change in level being greater than a distance between at least two of the plural reference positions such that one of the reference positions is reached by the wheel-side axle component.

* * * * *